Aug. 28, 1951          R. W. WALLACE          2,566,267
QUICK LOADING CAMERA BODY AND BACK CONSTRUCTION
Filed Jan. 17, 1947
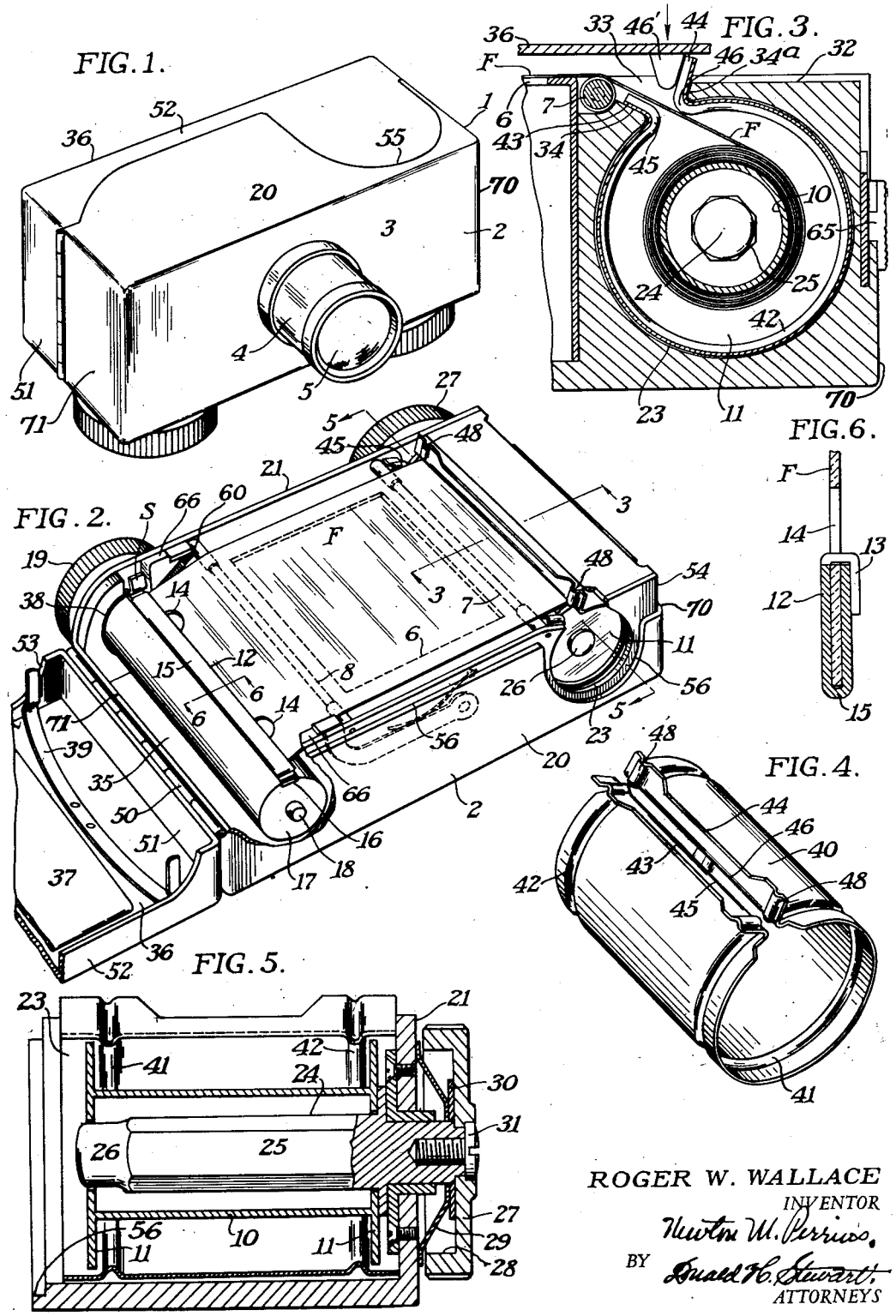
ROGER W. WALLACE
INVENTOR
BY
ATTORNEYS Patented Aug. 28, 1951

2,566,267

UNITED STATES PATENT OFFICE 2,566,267

QUICK-LOADING CAMERA BODY AND BACK CONSTRUCTION

Roger W. Wallace, Rochester, N. Y., assignor to Eastman Kodak Company, Rochester, N. Y., a corporation of New Jersey Application January 17, 1947, Serial No. 722,711

5 Claims. (Cl. 95—34)

This invention relates to photography and more particularly to quick loading camera body and back construction. One of the objects of my invention is to provide a roll film camera which can be quickly and easily loaded by an operator. Another object is to provide a camera body so constructed that no special precautions need to be taken in threading the camera film from a film supply to a film take-up chamber in order to correctly wind film through a camera. A still further object of my invention is to provide a roll film camera body and back construction which is particularly suitable for the use of a small size film, such as film 16- or 20-mm. in width, for instance. A still further object of my invention is to provide a roll film camera with winding keys which need not be moved back and forth to and from either film retorts or film spools. A still further object of my invention is to provide a camera and back construction which will adequately protect film against light while the camera is in use, and other objects will be pointed out in the following specification, the novel features being particularly pointed out in the claims at the end thereof.

In roll film cameras, it has been found that it is considerably more difficult to load extremely narrow roll film in a very small camera because the parts are so small that it is difficult to align the usual type of film with the spool chambers to wind properly therethrough. It is also difficult to thread the usual type of film or backing paper into the slot of a spool when the latter is of extremely small size and, while my present invention is particularly directed to the so-called miniature or sub-miniature cameras, it is obvious that such features may also be useful on cameras employing wider film of normal size.

Coming now to the drawings wherein like reference characters denote like parts throughout:

Fig. 1 is a perspective view of a sub-miniature camera which is constructed in accordance with and embodying a preferred form of my invention;

Fig. 2 is a view similar to Fig. 1 but on a somewhat enlarged scale showing the partially broken-away camera back and camera body in position for loading with the camera back open;

Fig. 3 is an enlarged fragmentary section taken on line 3—3 of Fig. 2;

Fig. 4 shows a typical spring sheath for film in perspective and on an enlarged scale; this sheath being particularly adapted for use in my improved camera;

Fig. 5 is a section taken on line 5—5 of Fig. 2; and

Fig. 6 shows a reinforced film end designed particularly for use in my improved form of camera.

My improved form of camera is here shown as being embodied in a sub-miniature size camera designed to take film 16- or 20-mm. in width. Fig. 1 shows the camera on a somewhat enlarged scale so that the size of this camera can be visualized. In its broadest aspects, my invention is directed to a camera body and camera back which can be quickly and easily loaded by moving a fresh film axially into a supply film chamber by drawing the film across an exposure frame and snapping a reinforcing strip on the end of the film into position against a winding hub in a film take-up chamber. In addition to the construction which permits rapid loading, the camera is also constructed so as to be thoroughly light-proof, and so as to prevent accidental exposure of film as the film is passed across the exposure frame for exposure.

The means for attaching the end of the film to the take-up hub, shown in the present application, is also shown in the application of Wallace and Ernisse, Ser. No. 722,712, filed January 17, 1947, entitled Film Threading and Releasing Device for Cameras.

Coming now to the drawings wherein like reference characters denote like parts throughout, my improved camera may be designated broadly as 1, and it may consist of a body portion 2 having a front wall 3 which, in this instance, may support a lens barrel 4 directly on the front wall. This lens barrel may include a shutter (not shown) and it may include usual lens elements, only the front one of which is shown at 5. If the objective is of relatively small aperture, no focusing is required, but if wide aperture lenses are used, the lens barrel 4 may be mounted on a suitable thread or other mechanism for focusing in any well-known manner.

The camera body 2, as best shown in Fig. 2, is open at the back and there is an exposure frame 6 having film-guiding rollers 7 and 8 across each end and through which the exposures are made on a film F.

While forming no part of my present invention, the film F may be wound upon a spool having a hub 10 in flanges 11 and the film is preferably equipped with a reinforced end 12 which may, as shown in Fig. 6, be formed of a piece of metal formed into U-shape and having lugs 13 passing through apertures 14 in the film and then folded down against the film so that the end of the film will carry a relatively rigid strip 15 which may be readily snapped into a slot 16 in a take-up hub 17. This hub is mounted on suitable trunnions 18 and is fixedly attached to a winding knob 19. This construction forms no part of the present application and is more fully described in the application of Wallace and Ernisse above referred to.

The camera body 2 has side walls 20 and 21, the former having a generally circular opening 23 which projects through the side wall 20. The reason for this opening is that it has been found much easier to load convolutions of film F wound on a hub, or in a suitable container, by moving it axially into a supply film chamber than it is to place a film through an open top in the chamber, as is customary. A shaft 24 is arranged axially of the generally cylindrical chamber 23 and this shaft, if desired, may have a configuration 25 which may be polygonal to drivingly engage one of the film spool flanges 11, and it is preferably provided with a cylindrical end 26 which may engage a complementary-shaped opening in the other film spool flange 11. Thus, one flange 11 will drive the film spool when a winding knob 27, attached to the shaft 24, is turned. This winding knob is preferably hollowed out at 28 and a friction spring 29 presses against the end camera wall 21 and against a pad 30 so as to tend to hold the winding knob in any set position. The winding knob is attached to the shaft 24, in the present instance, by a screw 31.

The spool chamber 23 which has a cylindrical opening, as above described forming a pocket for the film, is closed toward the back 32 of the camera, except for a slot 33 which has a pair of walls 34 and 34a tapering outwardly. Thus, the slot is wider on its outermost end than it is at its innermost end toward the shaft 24. This slot ends adjacent to roller 7 and the exposure frame 6.

The film F may be wound on a hub with the transverse rigid bar 15 extending transversely of the film end, and in loading the film into the supply spool chamber it is merely slid axially of the shaft 24 with the reinforcing end 15 extending through the slot 33. This end can then be drawn across the exposure frame 6 across the roller 9 and snapped down into the slot 16 where it may be held by one or more springs S mounted on the side walls 20 and 21 of the camera body.

The spool chamber 35 constitutes a take-up film chamber and after film has been loaded, the camera back 36 may be closed so that the pressure pad 37 may hold the film F flat on the exposure frame and so that the spring bracket S will hold the reinforcing rod 15 in the slot 16 until the knob 19 is turned, at which time the ends of the reinforcing bar 15 (which are somewhat wider than the film F, as shown) will be held by the slots 38 in the end walls 20 and 21 while the first convolution of film is being wound on the hub 17. This prevents accidental dislodgement of the film.

In the present instance, a spring sheath 40 encloses the film F wound on its film spool. This film sheath consists of a spring-metal, generally-cylindrical member preferably having inwardly-formed pads 41 and 42 positioned to contact only with the extreme edges of the film F so as not to press against a film area on which an exposure is to be made. The two outer edges of the sheath 43 and 44 are spaced apart somewhat further than the two inner edges 45 and 46, so that these two flanges may project more or less through the slot 33, as shown in Fig. 3. Generally, I prefer to have only the flange 44 extend a material distance from the slot since it is convenient to use this flange 44 as a means for sliding the film cartridge into and out of its film spool chamber and, in addition, this flange may be engaged by a cam 46' on the camera back 36 when the latter is moved to a closed position which is partially shown in Fig. 3. In this position the cam engages the beads 48 of the flange 44 and tends to separate the inner edges 45 and 46 to facilitate drawing the film through the slot, as indicated in Fig. 3. While this sheath is a convenience and an added protection for the film, it is not necessary with all types of film. With color film, for instance, it is often desirable to use such a sheath since the sheath with the flanges 11 of the film spool afford considerably greater light protection than when such a sheath is not used.

It is desirable to prevent any stray light from entering the camera when the back 36 is closed and in a picture-taking position. I preferably hinge the back 36 as indicated at 50 in Fig. 2, and the back is provided with a flange 51 extending across one end with flanges 52 and 53 extending across the sides of the back and with the flange, not shown, for extending across the rabbet 54 on the supply film chamber end of the camera back. In addition, the camera back is provided with an extension on one side 55 which lies over the circular opening 23 in the end wall 20 of the camera. The camera body is provided with a rabbet 56 which extends completely around the camera body as follows. The rabbet 56 extends along the side wall 20 around the circular opening 23 across the end wall 70 along the side wall 21 and down around the end wall 71 of the camera which also forms the end wall of take-up chamber 35. Thus, when the camera back 36 is in its closed position, shown in Fig. 1, there is a light-tight joint extending completely around the camera back when the camera is in condition for exposure.

There are a number of advantages in the above-described camera construction. It overcomes the frequent difficulty with film winding keys which must be moved axially to and from a film spool, since both of the winding knobs 27 and 19 are fixedly attached to their respective hubs. Second, it has been found much easier to slide a film cartridge axially into a wide opening in a closed film supply chamber (except for the slot leading therefrom) than it is to load film between spool-centering means which must be moved. Third, it is much easier to provide a satisfactory rabbet between the camera back and the camera body and if the film cartridge has been improperly loaded in its cylindrical container, the camera back cannot be closed because the film hub and its spring sheath (as shown in Fig. 5) must be completely in the camera body before the back can close. Also, as more fully described in the application of Wallace and Ernisse, it is a very simple matter to snap a reinforcing strip 15 into a slot 16 in a take-up hub to wind the film thereon and, as described in this application, the reinforcing strip can be drawn directly from the slot 16 in the hub 17 through the arcuate slots 60 (only one of which is shown) by merely turning the knob 27 and permitting the ends of the reinforcing strip to slide up through this slot. Thus, the loading and unloading of my improved camera can be very quickly and easily accomplished without skill on the part of an operator.

Assuming that the camera is ready for use, the operator may release the latch member 65 which may be of any convenient type to release the camera back 36, so that it may be moved about the hinge 50 into an open, or loading, position. The film cartridge which consists of the convolutions of film mounted on a hub or spool, with or without the spring sheath 40, is then slid axially through the open end 23 of the normally-closed film supply chamber pocket with the reinforced film end 15 projecting through the slot 33. In sliding the film cartridge axially, it is guided by the rounded end 26 onto the polygonal section 25 of the winding shaft and the user may then slide the reinforced strip across the exposure frame 6 and across the guide rails 66, snapping the reinforced strip 15 between spring members S. It will be noticed that in doing this, only a short length of film is withdrawn from the substantially-closed film supply compartment 23. The camera back is then closed and the knob 19 is turned to the first exposure which is preferably after a length of film, equal to one or two exposure areas, has been drawn across the exposure frame 6. This takes up any film which may have been fogged in loading the camera. The film is then advanced and exposed until all of the film has been exposed, at which time the operator merely turns the knob 27 in a direction to rewind the film on its original hub, or spool, in the generally cylindrical pocket of the film chamber 23. This can be quickly accomplished; the camera back opened and using the flange 44 as a handle, the film cartridge may be rapidly slid out from the pocket of the film supply chamber 23. If the spring sheath is omitted, the spool, or hub, can readily be dislodged by gravity, since the size of the cylindrical pocket of the container 23 is such as to provide a free-sliding fit between the film cartridge and the generally closed container. If the spring sheath 40 is used in opening the camera back 36, the cam 46 will release the flange 44 and the flanges 44 and 45 will move toward each other, closing the slot, and permitting free-sliding movement of the sheath.

I claim:

1. A roll holding camera comprising a body having a movable back, the body being formed by side walls, end walls and a front wall, spool chambers lying at opposite ends of the camera body, an exposure frame extending between the two spool chambers for supporting a film area in position for exposure, one film chamber constituting a supply film chamber and comprising a member including a cylindrical pocket extending axially through one side wall and adapted to receive a film cartridge endwise, said film cartridge comprising a spool wound with film, the spool and film being enclosed in a cylindrical sheath having walls forming a slot extending axially thereof with the ends of the sheath flared outwardly from each side of the sheath slot, said cylindrical pocket constituting a supply spool holder and having walls of the pocket forming a slot extending outwardly through the pocket towards and adjacent to the exposure frame at one end thereof, the width of said slot in the pocket being greater than the width between the outwardly flared ends of the sheath, the film cartridge sheath having a free sliding fit with the cylindrical pocket constituting the supply spool chamber to move axially relatively thereto, the camera back including a flange extending over and normally covering the cylindrical pocket constituting the film supply spool holder and covering, the exposure frame and the spool chamber at the opposite end of the camera from the film supply chamber.

2. The roll holding camera defined in claim 1 characterized by the walls of the slot in the cylindrical pocket constituting the supply spool holder and extending towards and adjacent to the exposure frame, diverging outwardly and away from the axis of the cylindrical pocket of the spool chamber and providing clearance for the outwardly flared ends of the sheath enclosing the film cartridge when the sheath and film lie in the pocket.

3. The roll holding camera defined in claim 1 characterized by the walls of the slot in the cylindrical pocket constituting the supply spool holder extending towards and adjacent to the exposure frame and diverging outwardly and away from the axis of the cylindrical pocket and providing clearance for the outwardly flared ends of the sheath enclosing the film cartridge to guide the sheath enclosed film cartridge axially relative to the supply film chamber, and a protuberance on the movable camera back to enter between the outwardly flared sheath ends when the latter has been axially loaded into the pocket of the supply chamber to engage one of said outwardly flared sheath ends while lying out of contact with the film and increase the space between the outwardly flared end walls of the sheath to facilitate winding film therethrough.

4. A roll holding camera comprising a body having a movable back, the body being formed by side walls, end walls and a front wall, spool chambers lying at opposite ends of the camera body, an exposure frame extending between the two spool chambers for supporting a film area in position for exposure, one film chamber constituting a supply film chamber and comprising a cylindrical pocket extending axially through one side wall and having walls forming a slot extending outwardly toward and adjacent to the exposure frame through which film may pass to the exposure frame, the camera back including a plate normally covering the exposure frame and both spool chambers and an offset extension on one side of the camera back for covering the cylindrical pocket extending through the side wall of the camera constituting, when open, a passageway for a film spool to and from the film pocket, said camera back being movable to expose the exposure frame and film spool chambers for loading and unloading with film, said cylindrical pocket being adapted to receive a film cartridge adapted for use with the roll film camera and comprising film convolutions wound on a spool, a spring sheath enclosing the film and spool and of a smaller outside diameter than the cylindrical pocket of the supply spool chamber and adapted to slide axially therein to a position in which the camera back may enclose the film chambers and exposure frame.

5. A roll holding camera comprising a body having a movable back, the body being formed by side walls, end walls and a front wall, spool chambers lying at the ends of the camera body, an exposure frame extending between the two spool chambers for supporting a film area in position for exposure, one film chamber constituting a supply film chamber and comprising a cylindrical pocket extending axially through one side wall and having walls forming a slot extending outwardly toward and adjacent to the exposure frame through which film may pass to the exposure frame, the camera back including a plate normally covering the exposure frame and both spool chambers and an offset extension on one side of the camera back for covering the cylindrical pocket extending through the side wall of the camera constituting a passageway for a film spool to and from the cylindrical pocket, said camera back being movable to expose the exposure frame and film spool chambers for loading and unloading with film, said film pocket being adapted to receive a film cartridge adapted for use with the roll film camera and comprising film convolutions wound on a spool, a spring sheath enclosing the film and spool and of a smaller outside diameter than the cylindrical pocket of the supply spool chamber and adapted to slide axially therein, and outwardly flared ends on the spring sheath positioned to engage and slide in the slot leading from the supply spool chamber to the exposure frame, said last named slot in the cylindrical pocket of the spool chamber having a normal width several times that of the outwardly flared ends of the spring sheath, and a projection on the camera back and engageable with the outwardly flared ends of the sheath as the back is moved to a closed position to separate the outwardly flared walls of the spring sheath to facilitate winding film therethrough.

ROGER W. WALLACE.

REFERENCES CITED

The following references are of record in the file of this patent:

UNITED STATES PATENTS

| Number | Name | Date |
|---|---|---|
| 1,409,265 | Webb | Mar. 14, 1922 |
| 1,996,782 | Wood | Apr. 9, 1935 |
| 2,043,902 | Mihalyi | June 9, 1936 |
| 2,236,917 | Pollock | Apr. 1, 1941 |
| 2,253,090 | Peterson | Aug. 19, 1941 |
| 2,323,009 | Claudot et al. | June 29, 1943 |
| 2,336,273 | Mihalyi | Dec. 7, 1943 |